United States Patent [19]
Suzuki et al.

[11] Patent Number: 5,528,398
[45] Date of Patent: Jun. 18, 1996

[54] COLOR LIQUID CRYSTAL DEVICE HAVING COLOR FILTERS ON THE SUBSTRATE WITH FEWER ELECTRODES

[75] Inventors: Masaaki Suzuki, Yokohama; Kazuya Ishiwata, Yokosuka, both of Japan

[73] Assignee: Canon Kabushiki Kaisha, Tokyo, Japan

[21] Appl. No.: 249,204

[22] Filed: May 26, 1994

[30] Foreign Application Priority Data

May 26, 1993 [JP] Japan .................................. 5-124194

[51] Int. Cl.⁶ .................................................. G02F 1/1335
[52] U.S. Cl. .................................................. 359/68
[58] Field of Search ........................................ 359/68, 66

[56] References Cited

U.S. PATENT DOCUMENTS

| | | | |
|---|---|---|---|
| 5,013,138 | 5/1991 | Roosen et al. | 359/68 |
| 5,159,478 | 10/1992 | Akiyama et al. | 359/68 |
| 5,177,627 | 1/1993 | Ishiwata et al. | 359/68 |
| 5,185,059 | 2/1993 | Nishida et al. | 156/659.1 |
| 5,194,976 | 3/1993 | Nakano et al. | 359/68 |
| 5,237,437 | 8/1993 | Rupp | 359/68 |
| 5,278,683 | 1/1994 | Nishida et al. | 359/66 |
| 5,282,070 | 1/1994 | Nishida et al. | 359/67 |
| 5,317,437 | 5/1994 | Katakura | 359/68 |

*Primary Examiner*—William L. Sikes
*Assistant Examiner*—Charles Miller
*Attorney, Agent, or Firm*—Fitzpatrick, Cella, Harper & Scinto

[57] ABSTRACT

A color liquid crystal display device is constituted by a first substrate having thereon a plurality of scanning electrodes, a second substrate disposed opposite to the first substrate and having thereon a plurality of data electrodes intersecting the scanning electrodes, a liquid crystal disposed between the scanning electrodes and the data electrodes, and color filter segments of at least three colors including red, green and blue disposed so as to form color display pixels each at an intersection of the scanning electrodes and data electrodes. The color filter segments of at least three colors respectively comprise a colored resin segment and are disposed on one of the first and second substrates having fewer electrodes thereon. As a result, the occurrence of defects, such as inclusion of foreign matter leading to short circuit between adjacent electrodes, during the color filter production step can be minimized, thus providing an improved product yield as a whole.

7 Claims, 4 Drawing Sheets

5,528,398

COLOR LIQUID CRYSTAL DEVICE HAVING COLOR FILTERS ON THE SUBSTRATE WITH FEWER ELECTRODES

FIELD OF THE INVENTION AND RELATED ART

The present invention relates to a liquid crystal device comprising an electrode plate equipped with a color filter for constituting color image display elements capable of displaying at least three colors.

A conventional color filter for displaying at least three colors in a color liquid crystal display device is disposed in the following manner.

As shown in FIG. 4 (and the corresponding sectional views in FIGS. 5 and 6), color filter stripes 1a, 1b and 1c are different colors having the shapes of stripes corresponding to data electrodes 5 and intersecting scanning electrodes 2 are all disposed on a substrate 6 on which the data electrodes 5 are disposed. This is based on the following reason.

In a case where each mono-color pixel is provided with a separate color filter segment, the color filter segments have to be disposed two-dimensionally in strict alignment with mono-color pixels each disposed at an intersection of the scanning electrodes and data electrodes. In contrast thereto, if the color filter is disposed in a conventional manner as described above, it is sufficient that the stripe-shaped color filter segments are disposed in parallel alignment with the data electrodes, the required accuracy of alignment is substantially alleviated.

However, in a conventional liquid crystal device as described above comprising stripe-shaped scanning electrodes on a substrate and stripe-shaped data electrode on another substrate disposed opposite to the above-mentioned substrate, the number of the data electrodes is larger than that of the scanning electrodes. More specifically, in the case of a color liquid crystal device shown in FIG. 4, for one full-color pixel, three color stripes (1a, 1b and 1c) of data electrodes 5 are required for one stripe-shaped scanning electrode 2. Accordingly, the following problem has recently been uncovered.

The production process of an electrode plate equipped with a color filter comprising a colored resin requires the repetition of the following steps (i) and (ii) a number of times corresponding to the number of filter colors, i.e., at least three of red (R), green (G) and blue (B):

(i) a colored resin film having a sensistivity to each color is formed on a glass substrate, and (ii) the colored resin film is patterned into a prescribed shape of a stripe, a dot or a rectangle.

During the process, a foreign matter is highly liable to contaminate the filter. It is particularly difficult to remove a foreign matter attached at a stepwise height difference between the face of the colored resin segment and the non-resin-coated surface even by washing thereafter.

After the repetition of the above steps (i) and (ii), a step (iii) of forming a pattern of transparent electrode stripes in alignment with the color filter pattern of stripes, dots or rectangles is performed. In the step (iii), generally, a transparent electrode is formed on the entire surface, e.g., by sputtering and then patterned by a photolithographic process. In also the step (iii), however, a foreign matter is liable to attach to a stepwise difference in height between the color filter segment and the resin coating free surface, thereby causing a defect leading to short circuit between adjacent electrodes. Particularly, in case of a color ferroelectric liquid crystal display apparatus driven by a simple matrix drive scheme intended for a large-area high-resolution color display, the above problem has become pronounced partly because of a minute pixel pitch.

SUMMARY OF THE INVENTION

An object of the present invention is to provide a color liquid crystal display device having solved the above-mentioned problems of the conventional color liquid crystal display device.

Another object of the present invention is to provide a color liquid crystal display device facilitating the production steps and alleviating the occurrence of short circuit.

According to the present invention, there is provided a color liquid crystal display device, comprising a first substrate having thereon a plurality of scanning electrodes, a second substrate disposed opposite to the first substrate and having thereon a plurality of data electrodes intersecting the scanning electrodes, a liquid crystal disposed between the scanning electrodes and the data electrodes, and color filter segments of at least three colors including red, green and blue disposed so as to form color display pixels each at an intersection of the scanning electrodes and data electrodes, wherein the color filter segments of at least three colors respectively comprise a colored resin segment and are disposed on one of the first and second substrates having fewer electrodes thereon.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

In a preferred embodiment, the liquid crystal display device according to the present invention may be constituted as one suitable for a simple-matrix drive.

The color filter segments may preferably be disposed on one of the substrates having thereon the scanning electrodes.

Figure 1:
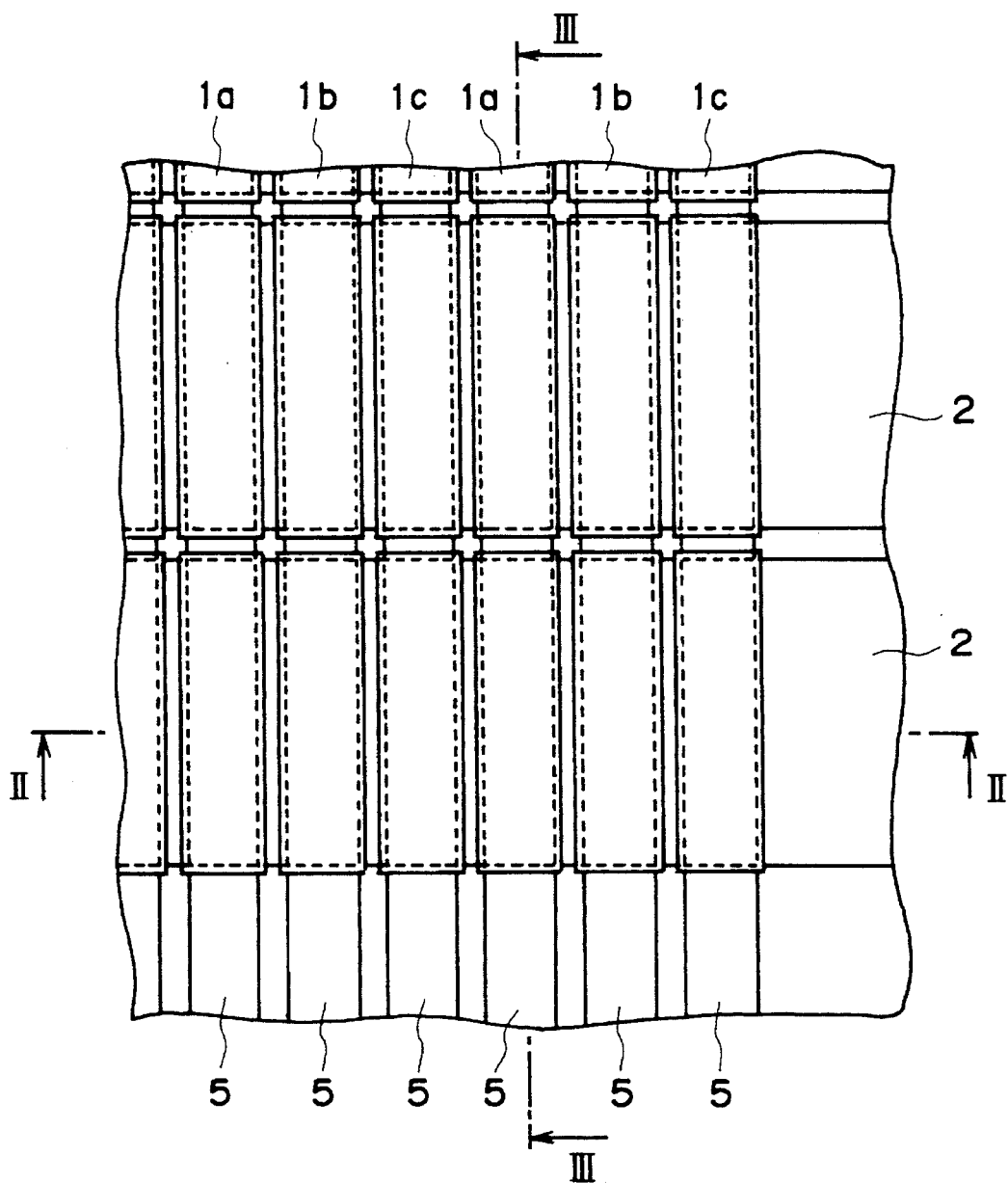
FIG. 1 is a plan view of an embodiment of the color liquid crystal display device according to the invention.
Figure 2:
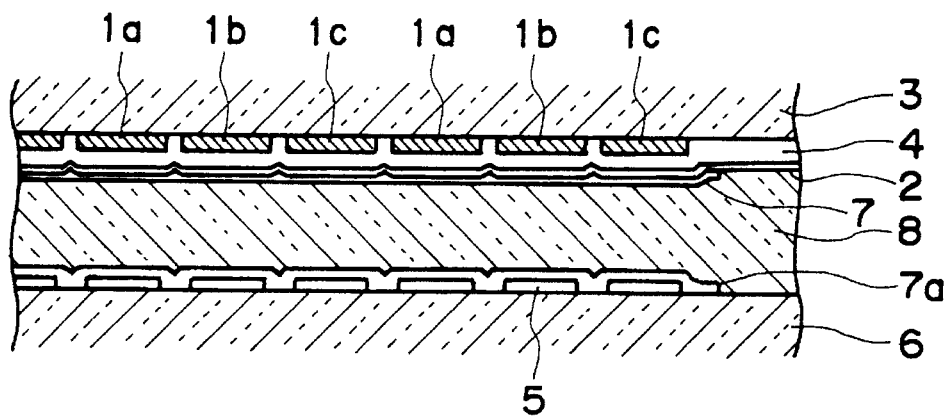
FIGS. 2 and 3 are sectional views of the liquid crystal display device taken along lines II—II and III—III, respectively, in FIG. 1.
Figure 3:
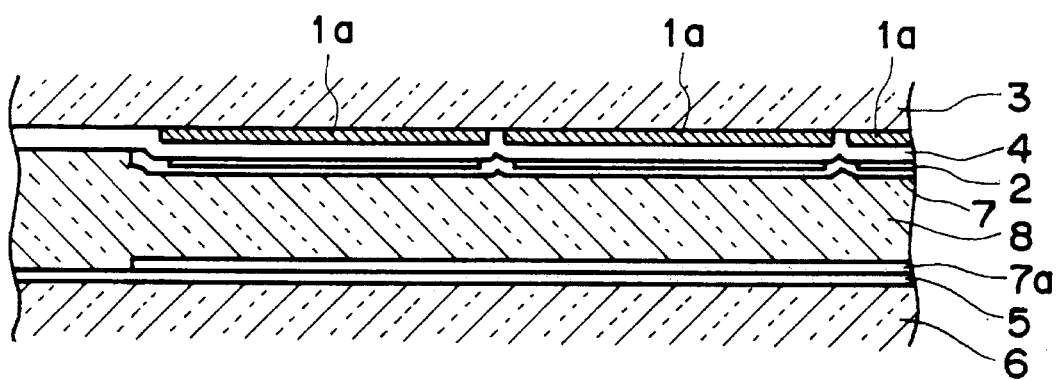

FIG. 1 is a plan view of a preferred embodiment of the color liquid crystal display device according to the present invention suitable for a simple-matrix drive, and FIGS. 2 and 3 are sectional views of the liquid crystal display device taken along lines II—II and III—III, respectively, in FIG. 1. Referring to FIGS. 1–3, color filter segments 1a (red), 1b (green) and 1c (blue) all in the form of relatively short stripes of colored resin are disposed regularly both longitudinally and laterally on a substrate 3 on which a group of scanning electrodes 2 in the form of transparent stripes are disposed in parallel with each other so as to extend in lateral alignment with the color filter segments 1a–1c. On another substrate 6 disposed opposite to the substrate 3, a group of data electrodes 5 also in the form of transparent stripes are disposed in parallel with each other to intersect the scanning electrodes 2 at right angles and extend in longitudinal alignment with the color filter stripes 1a–1c on the opposite substrate 3. The data electrodes 5 are disposed in a number which is at least three times that of the scanning electrodes 2.

An electrode-protecting insulating layer 4 is disposed between the color filter segments 1a–1c and the scanning electrodes 2. Further, the scanning electrodes 2 and the data electrodes 5 are coated with alignment control films 7 and 7a, respectively. Between the substrates 3 and 6 (more exactly, between the alignment control films 7 and 7a), a liquid crystal, such as a ferroelectric liquid crystal, may be disposed to form a liquid crystal device.

EXAMPLE 1

In a specific example, a pair of electrode plates including a first electrode plate structure composed of the members 3, 1a–1c, 4, 2 and 7 and a second electrode plate structure composed of the members 6, 5 and 7a, respectively in FIGS. 1–3, were prepared in the following manner.

First, for the preparation of the first electrode plate, a glass substrate 3 was coated with a coating liquid comprising a solution of a photocurable polyamide resin ("PA-1000", mfd. by Ube Kosan K. K.) at a concentration of 10% in N-methyl-2-pyrrolidone and further containing 1 wt. part of a red pigment ("Irgazin Red BPT", mfd. by Ciba-Geigy Corp.) dispersed therein per 2 wt. parts of the polyamide by a spinner coater in a dry thickness of 2 μm, followed by 30 min. of pre-baking at 80° C., exposure to a high-pressure mercury lamp through a patterning, ultrasonic washing with γ-butyrolactone, rinsing with a liquid comprising principally ethyl cellosolve, and 30 min. of post-baking at 150° C., thereby to form red color filter stripes 1a each measuring 320 μm×100 μm. Then, the above color filter stripe-formation process was repeated twice by using a green colorant ("Lionol Green 6YK", mfd. by Toyo Ink K.K.) and a blue pigment ("Heliogen Blue L7080", mfd. by BASF A.G., C.I. No. 74160), respectively, to form green color filter stripes 1b and blue color stripes 1c each measuring 320 μm×100 μm on the substrate 3 already having the red color filter stripes 1a, thus completing the color filter formation on the substrate 3.

Then, the color filter stripes 1a–1c on the substrate 3 was coated with a 900 Å-thick, protective film 4 photocured polyamide resin ("PA-1000") and a 500 Å-thick ITO film, which was then patterned into ITO stripes 2 in lateral alignment with the color filter stripes 1a–1c through photolithographic steps including application of a photoresist, pre-baking, exposure, development, post-baking, etching and peeling of the photoresist. The ITO stripes was further coated with a 200 Å-thick polyimide alignment film 7 through an ordinary process.

In this way, a fist electrode plate having 400 scanning electrodes 2 each in a width of 318 μm at a spacing of 12 μm was prepared.

Separately, a second electrode plate was prepared by forming ITO stripes 5 and a polyimide alignment film 7a in similar manners as described above.

Thus, a second electrode plate having 680×3 data electrodes 5 each in a width of 98 μm at a spacing of 12 μm.

The first and second electrode plates thus prepared were designed to provide a color liquid crystal panel having an effective display area size of 132 m×211 mm (diagonal size of about 10 inches) and 500×680 full-color display units (each including 3 color display pixels) at a pitch of 330 μm both longitudinally and laterally.

150 pairs of the first and second electrode plates were prepared in the above-described manner, and each electrode plate was examined with respect to the occurrence of short circuit between the adjacent electrodes. As a result, the short circuit occurrence rate was about 20% for the first electrode plate carrying the scanning electrodes 2 and also about 20% for the second electrode plate carrying the data electrodes 5.

Comparative Example 1

Figure 4:
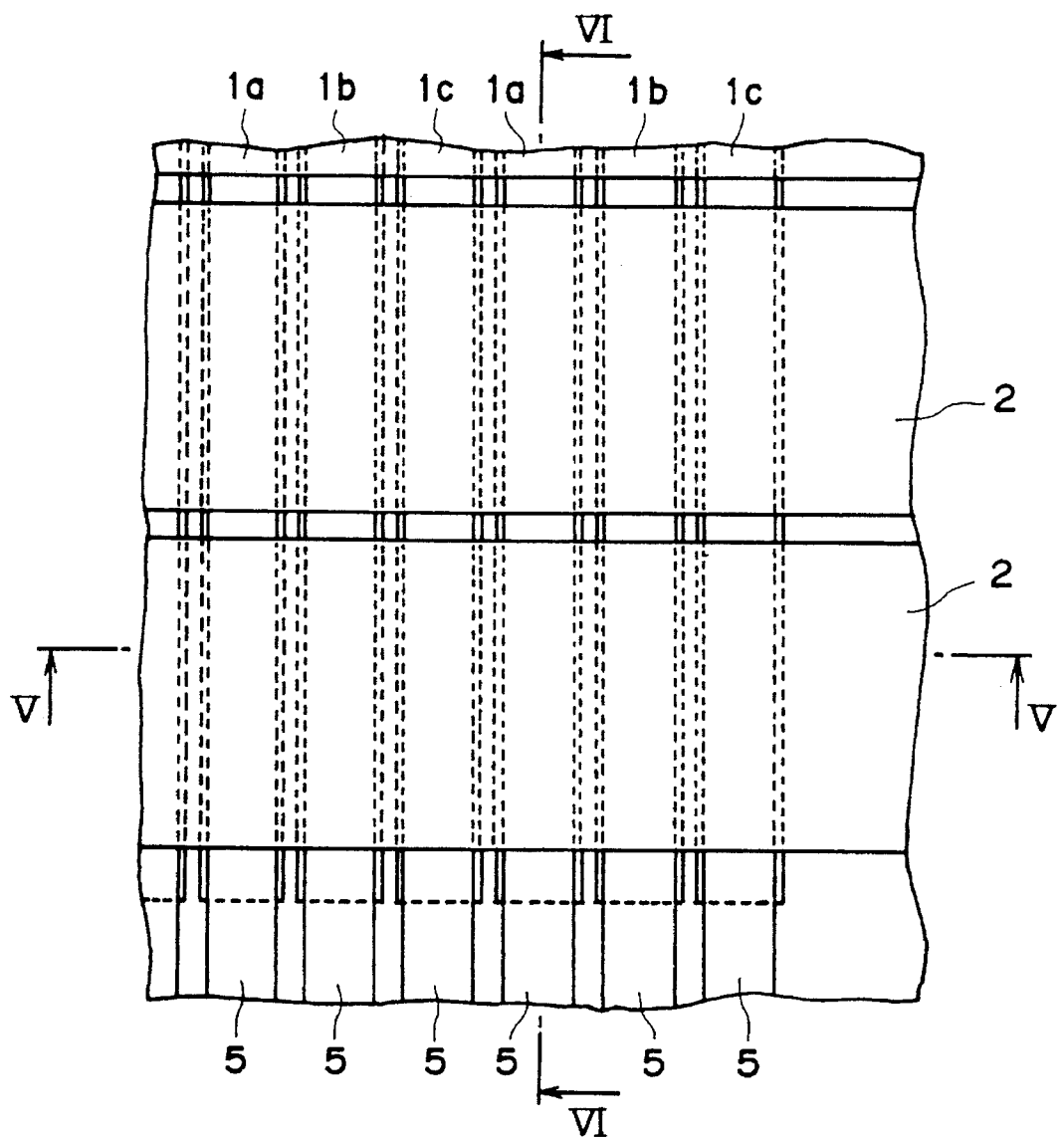
FIG. 4 is a plan view of a conventional color liquid crystal display device.
Figure 5:
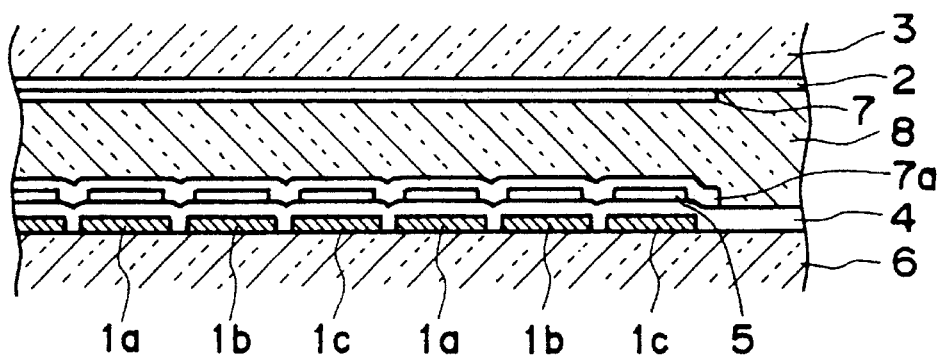
FIGS. 5 and 6 are sectional views of the liquid crystal display device taken along lines V—V and VI—VI, respectively, in FIG. 4.
Figure 6:
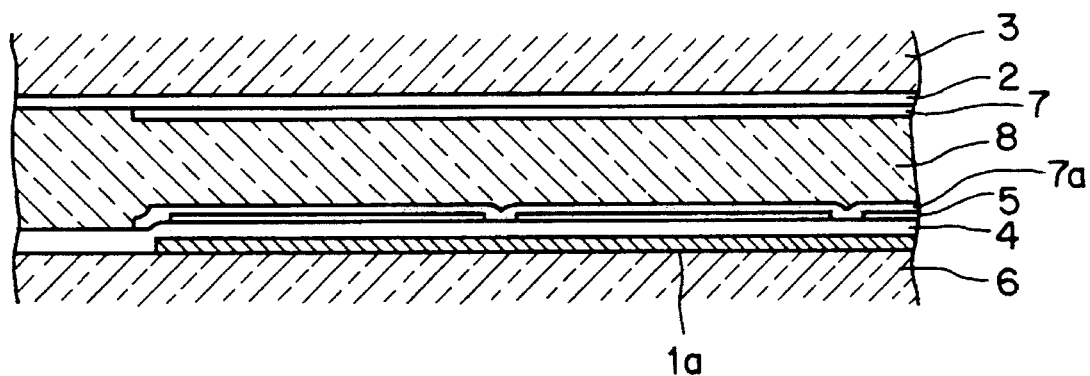

Additionally, 150 pairs of first electrode plate and second electrode plate were prepared in similar manners as in Example 1 except that the first and second electrode plates were designed to provide a liquid crystal device structure as shown in FIGS. 4–6, i.e., the color filter segments 1a–1c and the protective film 4 were formed on the second substrate 6.

The short circuit occurrence rate for the first (scanning) and second (data) electrode plate thus measured are shown in the following Table 1 together with the results of Example 1 described above.

TABLE 1

|  | Scanning electrode plate | Data electrode plate |
| --- | --- | --- |
| Example 1 | ca. 20% | ca. 20% |
| Comp. Example 1 | ca. 10% | ca. 60% |

As shown in the above Table 1, Example 1 rather provided an inferior result with respect to the scanning electrode plates but provided a remarkably better result with respect to the data electrode plates, thus providing a remarkably reduced short circuit occurrence rate as a whole.

The defective parts causing the short circuit on the first and second electrode plates were observed through a microscope. As a result, most defects were found to be caused by a foreign matter which was supposed to be mostly entrained at the time of color filter formation on the electrode plate carrying the color filter.

EXAMPLE 2

Comparative Example 2

The procedures of Example 1 and Comparative Example 1 were substantially repeated for providing larger sizes of first (scanning) electrode plates having 1024 scanning electrodes each in a width of 320 μm at a spacing of 10 μm and second (data) electrode plates having 1280×3 data electrodes each in a width of 100 μm at a spacing of 10 μm.

The first and second electrode plates were designed to provide a color liquid crystal panel having an effective display area size of 132 mm×211 μm at a spacing of 10 μm and second (data) electrode mm (diagonal size of ca. 21 inches) and 104×1280 full-color display units (each including 3 color display pixels) at a pitch of 330 μm both longitudinally and laterally.

Thus, the panel produced in this Example was larger in display area and had more electrodes than the one prepared in Example 1. The pixel size and resolution were similar to those in Example 1 but the electrode spacing was reduced to 10 μm.

The results of measurement of the short circuit occurrence rate are summarized in the following Table 2.

TABLE 2

|  | Scanning electrode plate | Data electrode plate |
| --- | --- | --- |
| Example 2 | ca. 30% | ca. 40% |
| Comp. Example 2 | ca. 25% | ca. 90% |

As shown in Table 2, as a result of the above-mentioned design change, the electrode plates of Comparative Example 2 for providing a liquid crystal panel having a conventional color filter arrangement as shown in FIGS. 4–6 showed a very high defect occurrence rate, particularly the data electrode plates showing a defect occurrence rate of about 90%.

In contrast thereto, Example 2 according to the present invention could reduce the defect occurrence rate of the data electrode plates to a half or below.

As described above, according to the present invention characterized as an improvement in color filter arrangement in a color liquid crystal display device, it has become possible to reduce the defect occurrence rate in the production process, thus providing an improved product yield.

What is claimed is:

1. A color liquid crystal display device, comprising a first substrate having thereon a plurality of scanning electrodes, a second substrate disposed opposite to the first substrate and having thereon a plurality of data electrodes intersecting the scanning electrodes, a liquid crystal disposed between the scanning electrodes and the data electrodes, and color filter segments of at least three colors including red, green and blue disposed so as to form color display pixels each at an intersection of the scanning electrodes and data electrodes, wherein the color filter segments of at least three colors respectively comprise a colored resin segment and are disposed on one of the first and second substrates having fewer electrodes thereon, the respective color segments being spaced apart from each other in a direction of extension of said fewer electrodes.

2. A liquid crystal display device according to claim 1, wherein the color filter segments are disposed on the first substrate.

3. A liquid crystal display device according to claim 1, having a structure suitable for a simple-matrix drive.

4. A liquid crystal display device according to claim 3, wherein the color filter segments are disposed on the first substrate.

5. A liquid crystal display device according to claim 1, wherein each color filter segment is disposed in alignment with one color display pixel.

6. A liquid crystal device according to claim 1, wherein the respective color segments are disposed below the fewer electrodes.

7. A liquid crystal device accordint to claim 6, wherein the fewer electrodes are the scanning electrodes.

* * * * *

UNITED STATES PATENT AND TRADEMARK OFFICE
CERTIFICATE OF CORRECTION

PATENT NO. : 5,528,398

DATED : June 18, 1996

INVENTOR(S) : Suzuki, et al.

It is certified that error appears in the above-identified patent and that said Letters Patent is hereby corrected as shown below:

COLUMN 1

Line 33, "electrode" should read --electrodes--.
Line 63, "also" should be deleted.

COLUMN 3

Line 57, "fist" should read --first--.
Line 64, "Thus" should read --In this way,--.
Line 65, "$\mu$m" should read --$\mu$m was prepared--.

UNITED STATES PATENT AND TRADEMARK OFFICE
CERTIFICATE OF CORRECTION

PATENT NO. : 5,528,398

DATED : June 18, 1996

INVENTOR(S) : Suzuki, et al.

It is certified that error appears in the above-identified patent and that said Letters Patent is hereby corrected as shown below:

COLUMN 4

Line 59, "104x1280" should read --1024x1280--.

COLUMN 6

Line 27, "accordint" should read --according--.

Signed and Sealed this

Fifteenth Day of October, 1996

Attest:

BRUCE LEHMAN

Attesting Officer    Commissioner of Patents and Trademarks